United States Patent
Ahn et al.

(10) Patent No.: US 10,440,725 B2
(45) Date of Patent: Oct. 8, 2019

(54) METHOD AND DEVICE FOR TRANSMITTING DATA IN UNLICENSED BAND

(71) Applicant: LG ELECTRONICS INC., Seoul (KR)

(72) Inventors: Joonkui Ahn, Seoul (KR); Suckchel Yang, Seoul (KR); Seonwook Kim, Seoul (KR); Hanjun Park, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/743,612

(22) PCT Filed: Jul. 29, 2016

(86) PCT No.: PCT/KR2016/008377
§ 371 (c)(1),
(2) Date: Jan. 10, 2018

(87) PCT Pub. No.: WO2017/023039
PCT Pub. Date: Feb. 9, 2017

(65) Prior Publication Data
US 2018/0199353 A1    Jul. 12, 2018

Related U.S. Application Data

(60) Provisional application No. 62/313,815, filed on Mar. 28, 2016, provisional application No. 62/199,244, filed on Jul. 31, 2015.

(51) Int. Cl.
*H04W 72/12*    (2009.01)
*H04W 52/36*    (2009.01)
(Continued)

(52) U.S. Cl.
CPC .......... *H04W 72/12* (2013.01); *H04W 16/14* (2013.01); *H04W 52/365* (2013.01);
(Continued)

(58) Field of Classification Search
CPC ............... H04W 72/12; H04W 52/365; H04W 74/0808; H04W 56/00; H04W 16/14; H04W 74/08; H04W 52/367
See application file for complete search history.

(56) References Cited

U.S. PATENT DOCUMENTS

2010/0222068 A1* 9/2010 Gaal ................. H04W 56/0045
455/450
2011/0170436 A1* 7/2011 Doan .................... H04B 7/155
370/252

(Continued)

FOREIGN PATENT DOCUMENTS

WO    2014111309    7/2014

OTHER PUBLICATIONS

PCT International Application No. PCT/KR2016/008377, International Search Report dated Oct. 26, 2016, 2 pages.
(Continued)

*Primary Examiner* — Andrew Lai
*Assistant Examiner* — Harry H Kim
(74) *Attorney, Agent, or Firm* — Lee Hong Degerman Kang & Waimey

(57) ABSTRACT

Provided are a method and apparatus for transmitting data in an unlicensed band. The device determines a downlink reception end time and an uplink transmission start time at which the uplink transmission starts in the unlicensed band. If the interval between the downlink reception end time and the uplink transmission start time is equal to or less than a threshold value, the device abandons the uplink transmission.

8 Claims, 9 Drawing Sheets

(51) Int. Cl.
*H04W 74/08* (2009.01)
*H04W 56/00* (2009.01)
*H04W 16/14* (2009.01)

(52) U.S. Cl.
CPC ........... *H04W 56/00* (2013.01); *H04W 74/08* (2013.01); *H04W 74/0808* (2013.01); *H04W 52/367* (2013.01)

(56) References Cited

U.S. PATENT DOCUMENTS

2014/0044105 A1 2/2014 Bontu et al.
2015/0280847 A1* 10/2015 Somasundaram ... H04J 11/0056
370/252
2017/0339588 A1* 11/2017 Moon ................... H04W 88/02

OTHER PUBLICATIONS

Kyocera, "Discontinuous Transmission Design for LAA", R1-153102, 3GPP TSG RAN WG1 Meeting #81, May 2015, 3 pages.
Kyocera, "LAA UL Design", R1-153104, 3GPP TSG RAN WG1 Meeting #81, May 2015, 3 pages.
Huawei, et al., "Frame structure for LAA DL and UL transmission operation", R1-152470, 3GPP TSG RAN WG1 Meeting #81, May 2015, 5 pages.

* cited by examiner

METHOD AND DEVICE FOR TRANSMITTING DATA IN UNLICENSED BAND

CROSS-REFERENCE TO RELATED APPLICATIONS

This application is the National Stage filing under 35 U.S.C. 371 of International Application No. PCT/KR2016/008377, filed on Jul. 29, 2016, which claims the benefit of U.S. Provisional Applications Nos. 62/199,244 filed on Jul. 31, 2015 and 62/313,815 filed on Mar. 28, 2016, the contents of which are all hereby incorporated by reference herein in their entirety.

BACKGROUND OF THE INVENTION

Field of the Invention

The present invention relates to wireless communication and, more particularly, to a method and apparatus for coordinating inter-cell interference in a wireless communication system.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method and device for transmitting data in an unlicensed band.

In an aspect, a method for transmitting data in a wireless communication system is provided. The method includes determining, by a wireless device, a downlink reception end time in an unlicensed band, determining, by the wireless device, an uplink transmission start time at which uplink transmission starts in the unlicensed band, and abandoning the uplink transmission if an interval between the downlink reception end time and the uplink transmission start time is less than or equal to a threshold.

In another aspect, a device for transmitting data in a wireless communication system includes a transceiver configured to transmit and receive a radio signal, and a processor coupled to the transceiver.

The processor is configured to determine a downlink reception end time in an unlicensed band, determine an uplink transmission start time at which uplink transmission starts in the unlicensed band, and abandon the uplink transmission if an interval between the downlink reception end time and the uplink transmission start time is less than or equal to a threshold.

In an environment where various communication protocols co-exist in an unlicensed band, interference can be mitigated.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
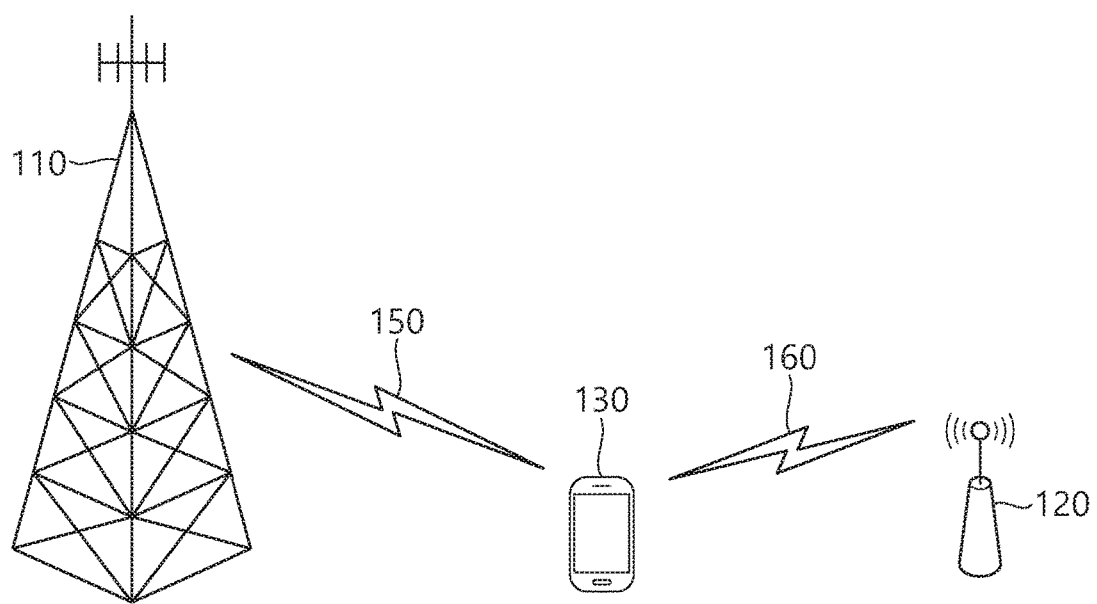
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Now, 3GPP LTE downlink (DL)/uplink (UL) scheduling and physical channels will be described.

In 3GPP LTE, the DL/UL scheduling is achieved in unit of subframes. The subframe includes a plurality of orthogonal frequency division multiplexing (OFDM) symbols, and a time required to transmit one subframe is defined as a transmission time interval (TTI). 1 TTI may be 1 ms. In 3GPP LTE, in case of a normal cyclic prefix (CP), one subframe includes 14 OFDM symbols, and in case of an extended CP, one subframe includes 12 OFDM symbols.

In 3GPP LTE, a DL physical channel may include a physical downlink control channel (PDCCH), a physical control format indicator channel (PCFICH), a physical hybrid-ARQ indicator channel (PHICH), and a physical downlink shared channel (PDSCH). A UL physical channel may include a physical uplink control channel (PUCCH) and a physical uplink shared channel (PUSCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for a UL hybrid automatic repeat request (HARQ). The ACK/NACK signal for UL data on a PUSCH transmitted by the wireless device is transmitted on the PHICH.

Control information transmitted through the PDCCH is referred to as downlink control information (DCI). The DCI may include resource allocation of the PDSCH (this is referred to as a DL grant) and resource allocation of a PUSCH (this is referred to as a UL grant).

In 3GPP LTE, a timing advance command (TAC) indicating a TA is given so that a BS adjusts reception timing of a UL signal transmitted by a plurality of UEs. The TA refers to an offset between a reception DL subframe and a UL subframe to be transmitted. The UE advances UL subframe transmission by a value corresponding to the TA.

Hereinafter, it is proposed that the UE adjusts transmission timing on the basis of the TAC in a cell operating in an unlicensed band (referred to as an 'unlicensed cell').

A cell operating in a licensed cell is referred to as a licensed cell. For clarity, it is assumed that the licensed cell is a primary cell, and the unlicensed cell is a secondary cell.

Figure 2:
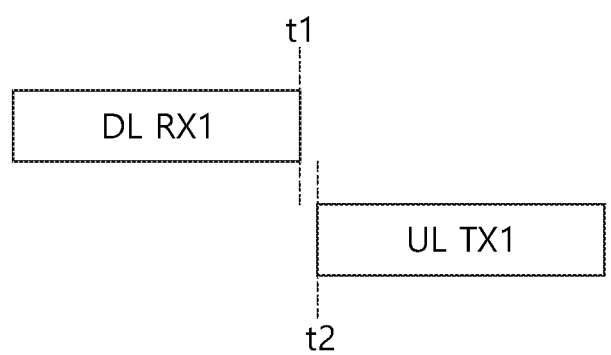
FIG. 2 shows transmission timing adjustment according to an embodiment of the present invention.

FIG. 2 shows transmission timing adjustment according to an embodiment of the present invention.

A DL reception end time (indicated by 't1' in the figure) may be defined as: (1) a time at which reception/detection of a DL signal transmitted by a BS ends in practice; or (2) a subframe boundary from a perspective of DL reception, or a time separated by a specific offset before/after the subframe boundary.

A UL reception end time (indicated by 't2' in the figure) may be defined as: (1) a time at which UL signal transmission of a UE starts in practice; or (2) a subframe boundary from a perspective of UE transmission, or a time separated by a specific offset before/after the subframe boundary.

The UL signal transmission may be scheduled by a primary cell (i.e., a licensed cell). Alternatively, the UL signal transmission may be scheduled by a secondary cell (i.e., an unlicensed cell).

A UL transmission start time may be a time after which TA given by a BS is applied.

When the UL transmission start time overlaps with a DL reception start time or when the UL transmission start time is earlier by T_limit than the DL reception end time, the UE may restrict corresponding UL transmission timing adjustment, may abandon corresponding UL signal transmission, or may abandon DL signal reception performed before the UL signal transmission. For example, if t2−t1<T_limit, the UE may abandon UL transmission or may adjust UL transmission timing so that t2−t1 is greater than or equal to T_limit.

T_limit may be a parameter defined as one or more consecutive CCA slots. The CCA slot is a basic unit for performing CCA.

It is possible to prevent interference from occurring between DL signal reception and UL signal transmission. A time required by the UE to perform CCA can be secured for UL signal transmission after DL signal reception.

When it is operated such that DL transmission performed by the BS is terminated with a specific time offset before a subframe boundary or UL transmission of the UE is started with a specific time offset after the subframe boundary, T_limit may be set such that UL transmission and DL reception do not overlap in practice. Alternatively, T_limit may be set such that a CCA time for UL transmission is not insufficient.

Figure 3:
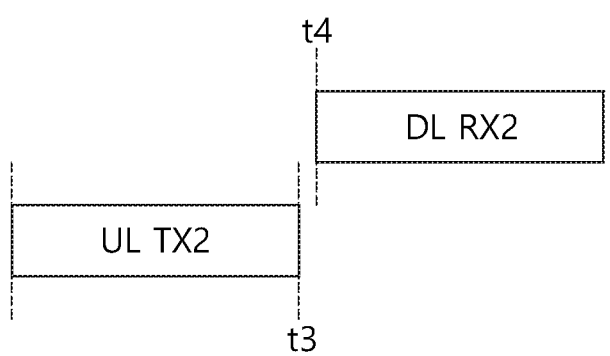
FIG. 3 shows transmission timing adjustment according to another embodiment of the present invention.

FIG. 3 shows transmission timing adjustment according to another embodiment of the present invention.

A UL transmission end time (indicated by 't3' in the figure) may be defined as: (1) a time at which UL signal transmission of a UE ends in practice; or (2) a subframe boundary from a perspective of UL transmission, or a time separated by a specific offset before/after the subframe boundary.

A DL reception start time (indicated by 't4' in the figure) may be defined as: (1) a time at which reception/detection of a DL signal transmitted by a BS starts in practice; or (2) a subframe boundary from a perspective of DL reception, or a time separated by a specific offset before/after the subframe boundary.

A UL transmission end time may be a time after which TA given by the BS is applied.

When the UL transmission end time overlaps with a DL reception start time or when the UL transmission end time lags behind the DL reception start time, the UE may restrict corresponding UL transmission timing adjustment, may abandon corresponding UL signal transmission, or may abandon DL signal reception performed before the UL signal transmission. For example, if t4−t3<T_limit, the UE may abandon UL transmission or may adjust UL transmission timing so that t4−t3 is greater than or equal to T_limit.

It is possible to prevent interference from occurring between DL signal reception and UL signal transmission. A time required by the BS to perform CCA can be secured for UL signal transmission after DL signal reception.

When it is operated such that UL transmission performed by the UE is terminated with a specific time offset before a subframe boundary or DL transmission of the BS is started with a specific time offset after the subframe boundary, T_limit may be set such that UL transmission and DL reception do not overlap in practice. Alternatively, T_limit may be set so that a CCA time for DL transmission is not insufficient.

Figure 4:
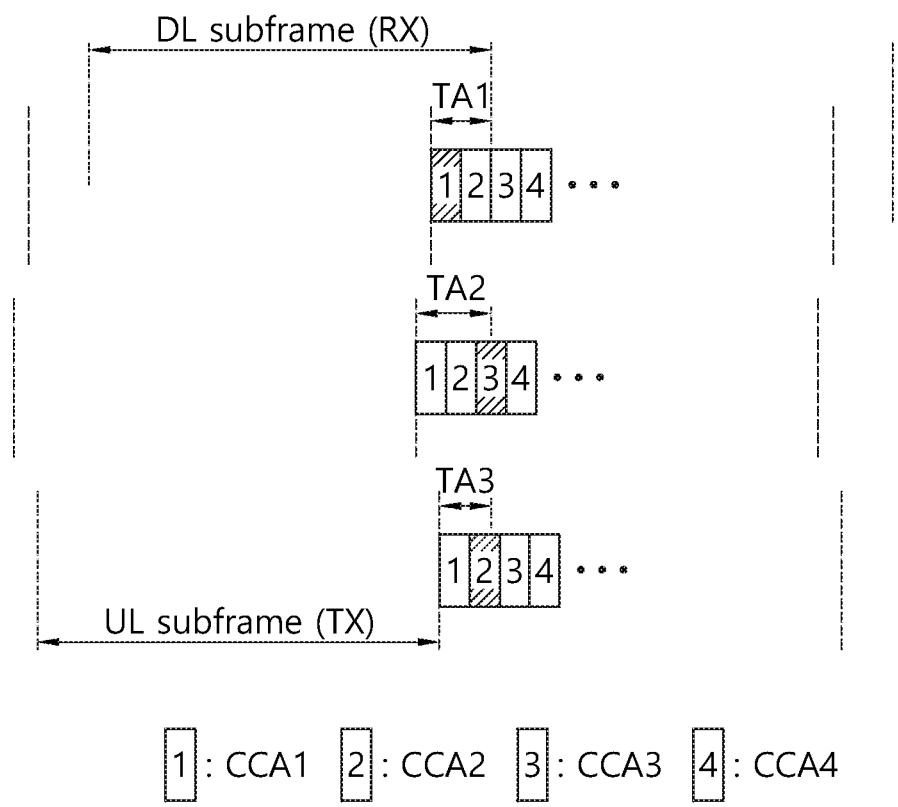
FIG. 4 shows an operation of performing clear channel assessment (CCA) according to an embodiment of the present invention.

In case of a half-duplex UE incapable of performing transmission/reception simultaneously for a plurality of carriers, the embodiments of FIG. 3 and FIG. 4 may be applied when UL transmission and DL reception are achieved for different carriers.

FIG. 4 shows an operation of performing CCA according to an embodiment of the present invention.

When a UE performs a CCA operation for UL transmission, a basic time unit for carrier sensing (CS) is defined as a CCA slot.

A plurality of CCA slots may be continuously defined based on a start point of a UL subframe. The start point of the UL subframe is adjusted by a TA which is a time offset relatively earlier than the DL subframe reception timing. The TA may be changed dynamically by a TAC from a BS or other factors.

An available CCA slot may be changed depending on a change in a TA value. Assume that the UE performs the CCA in CCA1 in a state of TA1. When the TA is changed from TA1 to TA2, only a part of CCA2 remains in new UL subframe timing. Alternatively, when the CCA is performed in the CCA1 in the state of TA1 and the TA value is changed to TA3, a part of the CCA1 is newly created. However, the CCA may not be performed with sufficient accuracy in a part of the CCA slot.

The CCA may not be performed in a CCA slot of which only a part remains due to TA adjustment (this is called a remaining CCA slot). When it is identified whether a channel is idle during a plurality of consecutive CCA slots, the remaining CCA slot is excluded.

For example, when the UE applies TA1 after the CCA1 in the state of TA1, the CCA is not performed in CCA2, and the CCA is performed after CCA3.

Figure 5:
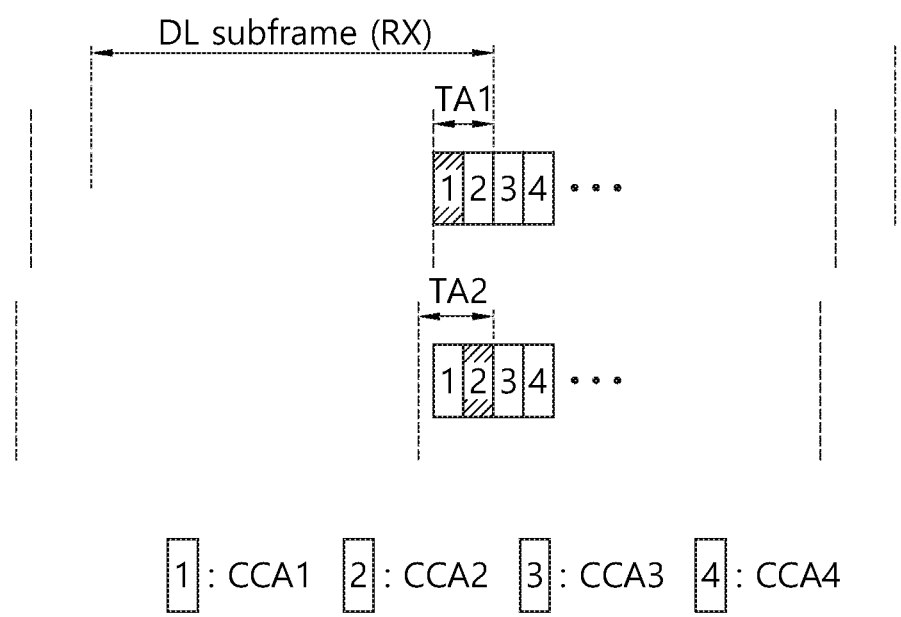
FIG. 5 shows an operation of performing CCA according to another embodiment of the present invention.

FIG. 5 shows an operation of performing CCA according to another embodiment of the present invention.

When a UE starts/resumes a CCA operation, first CCA slot timing is set based on UL subframe timing (a UL subframe boundary or an offset for the boundary). However, in a subsequent continuous CCA operation, CCA slot timing may be continuously applied irrespective of a change of the UL subframe timing.

The UE starts the CCA operation by creating a CCA slot from UL subframe timing in a state of TA1. Thereafter, even if TA2 is applied, the CCA operation is performed while continuously maintaining CCA slot timing started in the state of TA1.

Hereinafter, a method of adjusting UL transmission power by a UE in an unlicensed cell and a power headroom report (PHR) method are proposed.

Figure 6:
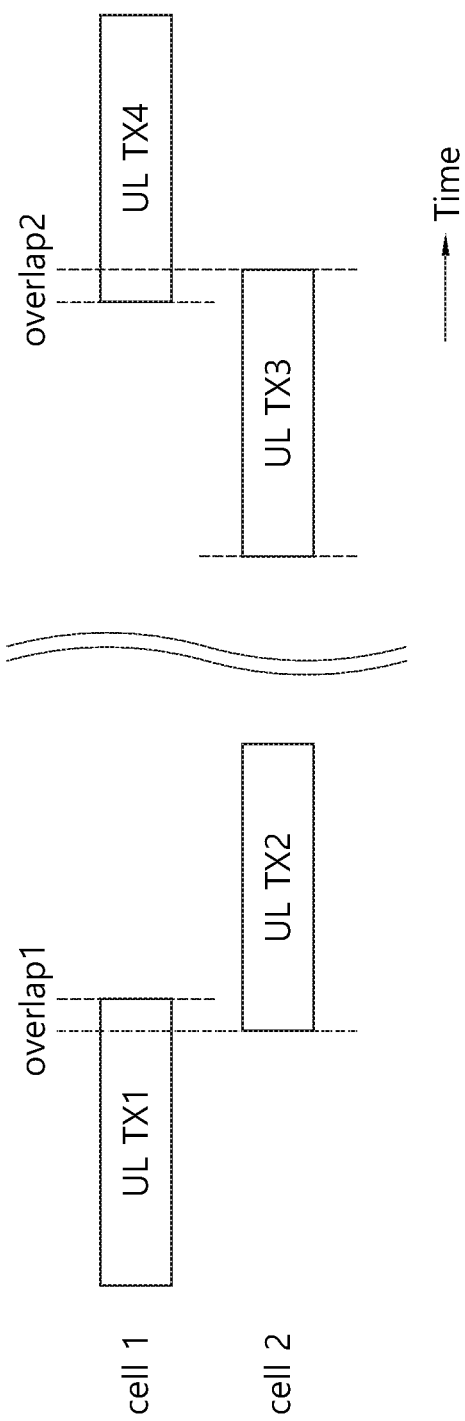
FIG. 6 shows transmission power adjustment according to an embodiment of the present invention.

FIG. 6 shows transmission power adjustment according to an embodiment of the present invention.

Assume that a plurality of cells including an unlicensed cell is configured to a UE. A different TA may be applied for each cell or for each cell group. Accordingly, UL transmission may overlap between the plurality of cells. For example, a last part of UL transmission of a cell 1 may overlap with a start part of UL transmission of a cell 2. Alternatively, a last part of UL transmission of the cell 2 may overlap with a start part of UL transmission of the cell 1.

The following operation is proposed when transmission power required for two signals cannot be supported in a duration in which the two signals overlap (this is called an 'overlapping duration') upon reaching a maximum transmission power limit of the UE.

In one embodiment, when a PUSCH transmitted in an unlicensed cell partially overlaps with a PUSCH transmitted in a licensed cell, transmission power of the PUSCH in the unlicensed cell of an overlapping duration may be adjusted to satisfy a maximum transmission power limit. Alternatively, PUSCH transmission in the unlicensed band may be abandoned. When the transmission power of the PUSCH transmitted in the unlicensed cell is $P_{unlicensed}$ and the transmission power of the PUSCH transmitted in the licensed cell is $P_{licensed}$, if $P_{unlicensed}+P_{licensed}>Pmax$, then $P_{unlicensed}$ is decreased or transmission of a corresponding signal is abandoned in the overlapping duration. This method may be applied when the last part of the PUSCH transmitted in the unlicensed band overlaps with the start part of the PUSCH transmitted in the licensed cell.

In another embodiment, when a start part of a UL signal transmitted in an unlicensed cell overlaps with a last part of a UL signal of a licensed cell, transmission power of the PUSCH in the licensed cell of an overlapping duration may be adjusted to satisfy a maximum transmission power limit. Alternatively, UL transmission in the licensed band may be abandoned. If $P_{unlicensed}+P_{licensed}>Pmax$ in the overlapping duration, $P_{licensed}$ may be decreased or transmission of a corresponding signal is abandoned in the overlapping duration.

If a UL signal of an unlicensed cell, which is to be transmitted in the overlapping duration, is an essential signal (e.g., a preamble, reference signal, or the like used for the purpose of AGC gain setting, frequency/time synchronization, or the like), it may be helpful not to adjust transmission power in terms of reliable reception. In addition, by performing transmission with sufficient transmission power at a transmission start time of a UL signal, other neighboring wireless nodes may be allowed to detect a corresponding signal through a CCA operation and not to cause interference.

Now, a power headroom report is described according to an embodiment of the present invention.

In 3GPP LTE, a power headroom report (PHR) is used to provide a BS with a difference between maximum transmission power Pcmax in a corresponding cell and estimated transmission power of a UL channel.

Figure 7:
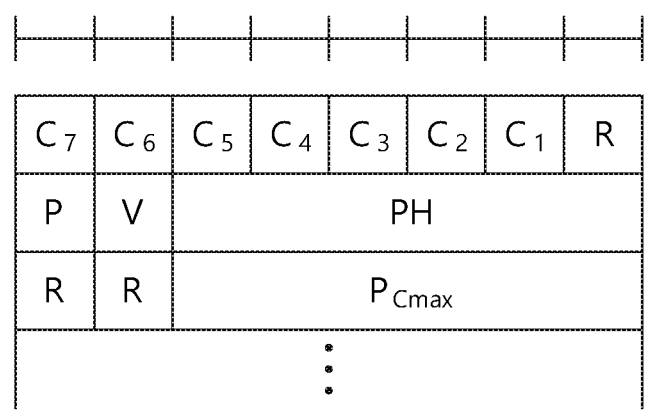
FIG. 7 shows an example of a media access control (MAC) control element (CE) used in a power headroom report (PHR).

FIG. 7 shows an example of a MAC control element (CE) used in a PHR.

$C_i$ indicates a presence/absence of a power headroom of an $i^{th}$ cell. If a Ci field is '1', it indicates that a PH field of a cell with index i is present. A V field indicates whether it is an actual power headroom or a virtual power headroom. The PH field indicates a power headroom level. Pcmax indicates maximum transmission power of a corresponding cell, which is used to calculate the PH field.

The actual power headroom is calculated based on power required by a wireless device to transmit a corresponding signal in any cell at actual transmission time. The actual power headroom is calculated by considering scheduling information such as bandwidth, transmission format, code rate, modulation scheme, or the like used to transmit a corresponding signal.

The virtual power headroom is calculated based on power required when a corresponding signal is transmitted at a time at which the signal is not transmitted in practice. The virtual power headroom is calculated by assuming a virtual signal format.

Specifically, a type-1 PHR and a type-2 PHR are present in the existing LTE. The type-1 PHR does not consider PUSCH transmission but considers only scheduled PUSCH transmission in a subframe n. The type-2 PHR considers both the PUCCH transmission and the PUSCH transmission in the subframe n. When the PUCCH is not transmitted or the PUSCH is not transmitted, a virtual PHR may be transmitted, which is calculated by assuming a basic format predetermined for the PUSCH or PUSCH which is not transmitted. The type-2 PHR is effective for a cell capable of transmitting the PUCCH, that is, a primary cell.

In a 3GPP LTE system, in general, a UE calculates a power headroom (PH) for each configured cell and reports it to a BS through MAC signaling or RRC signaling either periodically or when a specific event is satisfied. A PH value for any cell is a difference value between Pcmax,c which is maximum allowable power for a corresponding cell c and basically calculated in a corresponding subframe and transmission power of a UL signal transmitted by the UE through the corresponding cell in the corresponding subframe.

Pcmax,c is calculated as maximum power that can be transmitted in a corresponding cell under a condition that the UE satisfies a restriction requirement for a transmission spectrum by considering transmission in the corresponding cell or other cells in a corresponding subframe. A PHR reported by the UE in any cell of any subframe includes a PH for all cells which are configured for the UE.

UL signal transmission of the UE in an unlicensed cell is accompanied by a CCA operation. When it is intended to transmit a UL signal in a specific subframe, whether to perform transmission in the subframe in practice is determined according to a result of CCA performed immediately before transmission of the signal. Therefore, it is not easy to consider whether to transmit the UL signal in calculation of a PH value to be reported in the specific subframe. When the PH is calculated according to whether the UL signal is transmitted after the CCA is performed, a processing load of the UE may be significantly great.

It may be assumed that a corresponding UL signal is always not transmitted. When the UL signal is transmitted in practice, a PH is reported without considering a power back-off based on a peak-to-average power ratio (PAPR) or band-pass filtering or the like. Therefore, the BS may calculate power incorrectly.

Whether to transmit a scheduled UL signal is determined according to a result of performing CCA in an unlicensed band. Therefore, a more accurate criterion is required to calculate the PH in the unlicensed band.

Figure 8:
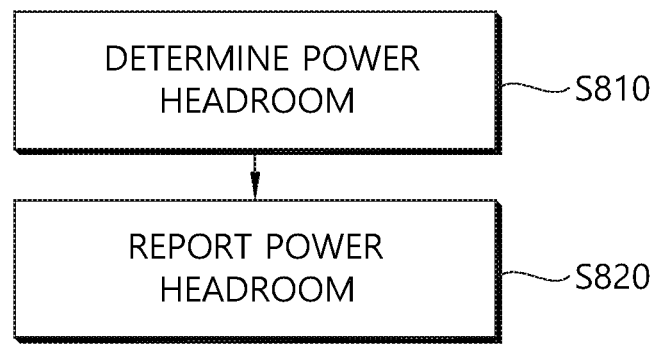
FIG. 8 shows a power headroom report according to an embodiment of the present invention.

FIG. 8 shows a power headroom report according to an embodiment of the present invention.

In step S810, a UE determines a power headroom. In step S820, the UE reports the power headroom.

In a first embodiment, when transmission of a UL signal (e.g., PUSCH, etc.) to the UE is scheduled in a specific subframe, the PH may be calculated based on scheduled UL transmission irrespective of whether transmission is performed in practice. Even if UL transmission is not performed as a result of a CCA operation in the specific subframe, Pcmax,c may be calculated by assuming that a corresponding signal is transmitted, and may calculate a PH in response thereto.

A MAC CE for the existing PHR may be directly utilized without having to cause inconsistency in PH calculation between a BS and the UE.

In a second embodiment, the PH may be calculated according to whether UL transmission is performed by considering the result of the CCA operation. If a UL signal is transmitted as the result of the CCA operation, Pcmax,c and PH are calculated by considering that the UL signal is transmitted. If the UL signal is not transmitted as the result of the CCA operation, Pcmax,c and PH are calculated by considering that the UL signal is not transmitted. The PHR may further include whether transmission of the UL signal is performed in a corresponding subframe.

In a third embodiment, the PHR of the unlicensed cell and the PHR of the licensed cell may be separated. The PHR of the unlicensed cell may be configured to be transmitted through the unlicensed cell. The PHR for the plurality of unlicensed cell may be configured to be transmitted through a specific unlicensed cell. The PHR for the licensed cell may be configured to be transmitted through the licensed cell.

The PHR through the licensed cell may include PH information not considering whether to perform transmission in the unlicensed cell. The PHR through the unlicensed cell may include PH information considering only transmission of the unlicensed cell. The PHR through the unlicensed cell may include PH information considering transmission of both the unlicensed cell and the licensed cell. The PHR through the unlicensed cell may include PH information considering UL transmission of an unlicensed cell in which the PHR is transmitted or an unlicensed cell group including the unlicensed cell in which the PHR is transmitted.

Figure 9:
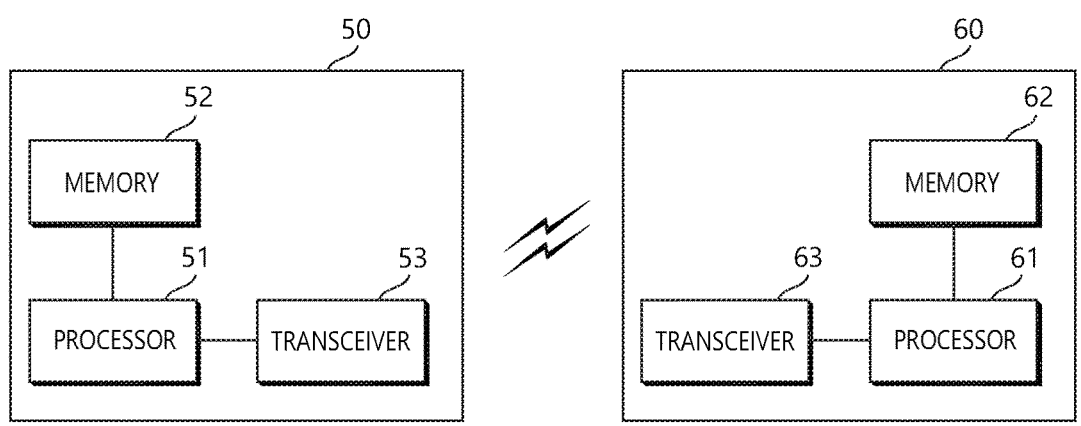
FIG. 9 is a block diagram showing a wireless communication system according to an embodiment of the present invention.

FIG. 9 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in a wireless communication system, the method comprising:
   determining, by a wireless device, a downlink reception end time in an unlicensed band;
   determining, by the wireless device, an uplink transmission start time at which uplink transmission starts in the unlicensed band;
   abandoning the uplink transmission if an interval between the downlink reception end time and the uplink transmission start time is less than or equal to a threshold; and
   performing a clear channel assessment (CCA) before the uplink transmission start time if the interval between the downlink reception end time and the uplink transmission start time is greater than the threshold,
   wherein a plurality CCA slots are continuously defined based on the uplink transmission start time,
   wherein available CCA slots are changed based on a timing advance (TA) applied to the uplink transmission start time, and
   wherein the performance of the CCA is not operated in one or more remaining CCA slots, which are identified as idle CCA slots during a TA adjustment.

2. The method of claim 1, wherein the threshold comprises one or more clear channel assessment (CCA) slots.

3. The method of claim 1, wherein the downlink reception end time corresponds to a last boundary of a downlink subframe.

4. The method of claim 1,
   wherein the uplink transmission is performed in a secondary cell operated in the unlicensed band, and
   wherein the uplink transmission is scheduled by a primary cell operated in a licensed band.

5. A device for transmitting data in a wireless communication system, the device comprising:

a transceiver configured to transmit and receive a radio signal; and a processor coupled to the transceiver and configured to:

determine a downlink reception end time in an unlicensed band;

determine an uplink transmission start time at which uplink transmission starts in the unlicensed band;

abandon the uplink transmission if an interval between the downlink reception end time and the uplink transmission start time is less than or equal to a threshold;

perform a clear channel assessment (CCA) before the uplink transmission start time if the interval between the downlink reception end time and the uplink transmission start time is greater than the threshold, wherein a plurality CCA slots are continuously defined based on the uplink transmission start time, wherein available CCA slots are changed based on a timing advance (TA) applied to the uplink transmission start time, and wherein the performance of the CCA is not operated in one or more remaining CCA slots, which are identified as idle CCA slots during a TA adjustment.

6. The device of claim 5, wherein the threshold comprises one or more clear channel assessment (CCA) slots.

7. The device of claim 5, wherein the downlink reception end time corresponds to a last boundary of a downlink subframe.

8. The device of claim 5, wherein the uplink transmission is performed in a secondary cell operated in the unlicensed band, and wherein the uplink transmission is scheduled by a primary cell operated in a licensed band.

* * * * *